E. GLEASON, R. HAMILTON & E. BRADLEY.
HORSE HAY-RAKE.
No. 175,449. Patented March 28, 1876.
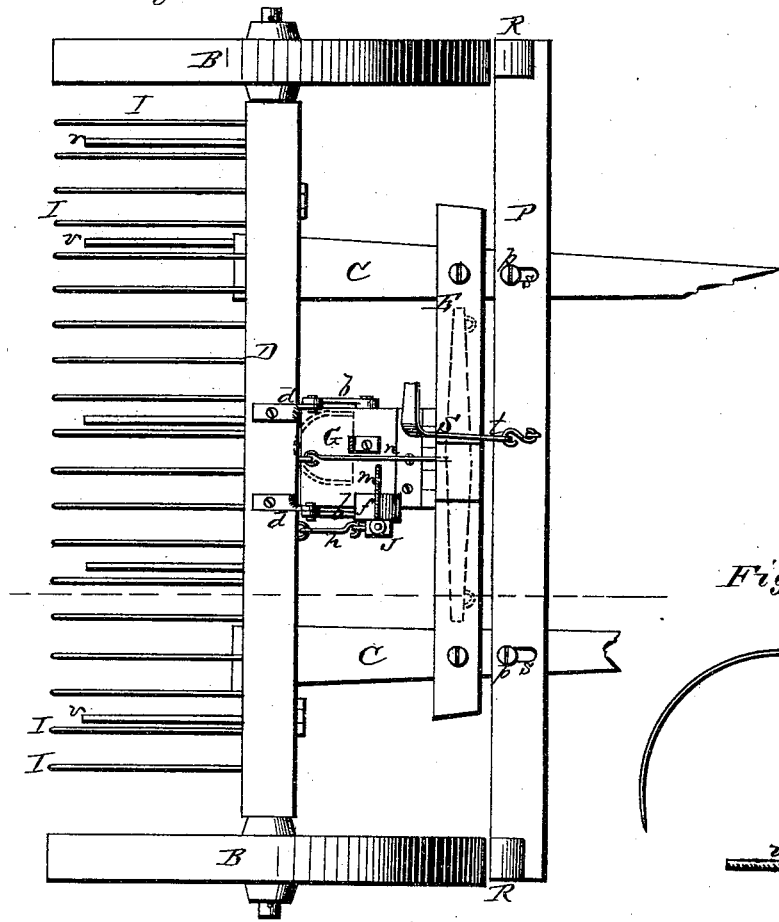
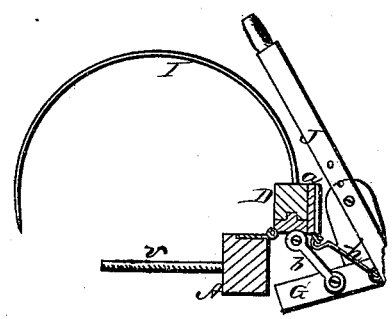
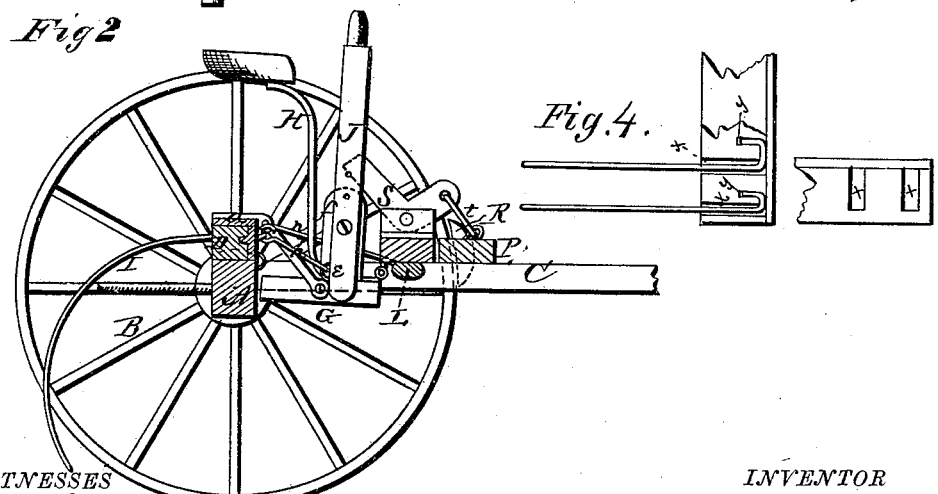
WITNESSES
Franck L. Durand.
C. L. Everth.
INVENTOR
E. Gleason, R. Hamilton, E. Bradley.
By Alexander Mason
Attorney

UNITED STATES PATENT OFFICE

ERASTUS GLEASON, ROBERT HAMILTON, AND EPHRAIM BRADLEY, OF GREENWICH, NEW YORK; SAID GLEASON AND HAMILTON ASSIGNORS TO SAID BRADLEY.

IMPROVEMENT IN HORSE HAY-RAKES.

Specification forming part of Letters Patent No. 175,449, dated March 28, 1876; application filed July 10, 1875.

*To all whom it may concern:*

Be it known that we, ERASTUS GLEASON, ROBERT HAMILTON, and EPHRAIM BRADLEY, of Greenwich, in the county of Washington, and in the State of New York, have invented certain new and useful Improvements in Horse Hay-Rakes; and do hereby declare that the following is a full, clear, and exact description thereof, reference being had to the accompanying drawings, and to the letters of reference marked thereon, making a part of this specification.

The nature of our invention consists in the construction and arrangement of a horse hay-rake, as will be hereinafter more fully set forth.

In order to enable others skilled in the art to which our invention appertains to make and use the same, we will now proceed to describe its construction and operation, referring to the annexed drawing, in which—

Figure 1 is a plan view of our horse hay-rake. Fig. 2 is a transverse vertical section of the same. Figs. 3 and 4 are detailed sections of certain parts thereof.

A represents the axle-tree, having the driving-wheels B B placed upon the spindles at the ends thereof. C C are the shafts secured to the axle-tree, and provided with the cross-bar E. D represents the rake-head, which is hinged at its lower front edge to the upper front edge of the axle-tree. The rake-head is simply a wooden bar, with a series of grooves, *x*, made crosswise in its upper surface. In these grooves the rake-teeth I I are placed, the inner ends of said teeth being bent, as shown in Fig. 4, and the extreme ends bent forward and laid in short grooves *y* between the grooves *x*. The teeth are then held in place by means of plates or bars *a a*, secured on the top and front of the rake-head. The grooves *x* are made gradually deeper from the front to the rear end, so that the teeth will have a certain amount of play up and down in the rake-head. At the lower rear edge of the cross-bar E is hinged a platform, G, which extends as far back as the axle-tree, and is supported by means of two pivoted bars, *b b*, connecting it with ears or arms *d d*, secured on the top of the rake-head, and extending down on the front thereof. The driver's seat H is supported on the hinged platform G, and on said platform is a standard, *f*, to the side of which is pivoted a lever, J. The lower end of this lever is, by a rod, *h*, connected with the front of the rake-head near the upper edge, the ends of said rod being bent to form eyes or loops, and fastened by staples *e e*, passed through them and into the lever and rake-head, respectively. From the side of the lever J projects a foot-piece, *m*, as shown.

L is the single-tree, to which the horse is attached, and which is located underneath the cross-bar E, and from the center of the single-tree extends a rod, *n*, above the hinged platform G, and connects with the rake-head at its upper front edge. By these means the rake is easily and quickly dumped when desired, and it is held down to its work by the driver putting his foot upon and bearing against the foot-piece *m* on the lever J, or by any other suitable means.

On the shafts C C, in front of the cross-bar E, is a brake-bar, P, provided at each end, on the rear side, with a brake-shoe, R, to come in contact with the driving-wheels B. The brake-bar P is provided with two cross-slots, *s s*, through which screws *p p* pass to hold the brake-bar to the shafts, and at the same time allow it to move freely back and forth. The brake-bar is, by a rod, *t*, connected w th a foot-lever, S, pivoted on the cross-bar and within reach of the driver, so that he can at any time apply the brakes. *v v* are clearing-teeth attached to and projecting rearward from the axle.

Having thus fully described our invention, what we claim as new, and desire to secure by Letters Patent, is—

1. The hinged rake-head D, provided with the tapering cross-grooves *x x* and short grooves *y*, in combination with the rake-teeth I I, having their inner ends bent, as described, and the plates *a a*, substantially as and for the purposes herein set forth.

2. The combination of the hinged rake-head D, with arms *d d*, connecting-bars *b b*, hinged platform G, and seat H, supported on the platform, substantially as and for the purposes herein set forth.

3. The combination of the axle A, rake-head D, hinged thereto, single-tree L, and rod n, connecting rake-head and single-tree, all substantially as and for the purposes herein set forth.

In testimony that we claim the foregoing we have hereunto set our hands and seals this 19th day of May, 1875.

ERASTUS GLEASON. [L. S.]
ROBERT HAMILTON. [L. S.]
EPHRAIM BRADLEY. [L. S.]

Witnesses:
HENRY GRAY,
S. L. STILLMAN.